United States Patent
Kosak

(10) Patent No.: US 6,641,229 B1
(45) Date of Patent: Nov. 4, 2003

(54) SPINDLE MOUNTING FOR ALUMINUM WHEEL CARRIER

(75) Inventor: Werner E. Kosak, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/032,898

(22) Filed: Oct. 25, 2001

(51) Int. Cl.$^7$ ................................................ B60B 35/02
(52) U.S. Cl. ...................... 301/132; 301/124.1; 29/520; 403/282; 411/81
(58) Field of Search ................... 301/35.621, 35.63, 301/35.626, 35.632, 131, 132, 135, 124.1; 29/520, 505; 403/279, 280, 282; 280/93.512, 124.125; 411/81

(56) References Cited

U.S. PATENT DOCUMENTS

| | | | |
|---|---|---|---|
| 306,754 A | * | 10/1884 | Horton |
| 1,086,166 A | * | 2/1914 | Hall |
| 2,370,773 A | * | 3/1945 | Bradley |
| 3,908,480 A | | 9/1975 | Afandor et al. |
| 4,002,286 A | | 1/1977 | Simon |
| 4,223,903 A | | 9/1980 | Grabb et al. |
| 4,545,601 A | | 10/1985 | Muller et al. |
| 4,828,328 A | | 5/1989 | Bowman |
| 4,974,989 A | * | 12/1990 | Salter ..................... 411/81 X |
| 5,145,204 A | | 9/1992 | Perkins |
| 5,171,068 A | * | 12/1992 | Wu ..................... 301/131 X |
| 5,281,005 A | | 1/1994 | Babcock et al. |
| 5,833,026 A | | 11/1998 | Zetterström |
| 5,938,292 A | | 8/1999 | Aaron, Jr. et al. |
| 6,138,357 A | | 10/2000 | Jones |
| 6,196,639 B1 | | 3/2001 | Di Ponio et al. |

* cited by examiner

*Primary Examiner*—Russell D. Stormer
(74) *Attorney, Agent, or Firm*—MacMillan, Sobanski & Todd, LLC

(57) ABSTRACT

A spindle to aluminum wheel carrier mounting is provided having increased contact area for reducing stress in the aluminum. The wheel assembly comprises a spindle, a wheel carrier, and a fastener. The spindle is comprised of ferrous material and includes a shank portion, a boss portion, and a fastening portion. The boss portion has a monotonically changing diameter along its longitudinal axis. The wheel carrier is adapted to be supported by a suspension system of the vehicle and has a wheel-facing side. The wheel carrier is comprised of aluminum and has a spindle-receiving aperture therethrough. The aperture has a variable diameter along its length to form a boss-receiving socket. The boss-receiving socket has a monotonically changing diameter substantially matching the boss portion. A fastener is joined to the fastening portion and draws the boss portion against the boss-receiving socket. Consequently, stresses in the aluminum wheel carrier are distributed over the boss-receiving socket.

31 Claims, 5 Drawing Sheets

SPINDLE MOUNTING FOR ALUMINUM WHEEL CARRIER

BACKGROUND OF THE INVENTION

This application is related to concurrently filed application U.S. Ser. No. 10/002,194, entitled "Aluminum Wheel Carrier and Spindle Assembly".

The present invention relates in general to spindles for wheel mounting in automotive vehicles, and, more specifically, to the attachment of cast iron or steel spindles to cast aluminum wheel carriers.

The use of lightweight materials in automotive vehicles is desired wherever possible in order to help increase fuel economy. Thus, the use of aluminum instead of iron or steel in vehicle suspension components is of increasing interest to vehicle manufacturers. However, the material properties of aluminum can be very different from those of steel or iron, meaning that aluminum cannot be directly substituted in every component in a straightforward way.

A vehicle suspension includes a spindle to which a wheel hub is mounted. The spindle is mounted to a wheel carrier such as a knuckle, axle, or other component. Due to strength and heat transfer requirements, the spindle is typically made of ferrous material, such as steel or iron. Prior art spindles have previously been made as an integral forging/casting with their carrier or have been mounted to their carriers by threading, welding, or press-fitting into a bore, for example.

One hurdle in the possible use of aluminum castings for wheel carriers has been the lack of an easy method to attach the spindle. Prior art mounting methods have been unsuccessful due to the distinct properties of steel/iron versus aluminum, such as aluminum's greater susceptibility to concentrated stress.

SUMMARY OF THE INVENTION

The present invention provides a spindle to aluminum wheel carrier mounting with increased contact area for reducing stress in the aluminum. As used herein, "aluminum" includes any alloy principally comprised of aluminum.

In one aspect of the invention, a wheel assembly for a vehicle comprises a spindle, a wheel carrier, and a fastener. The spindle is comprised of ferrous material and includes a shank portion, a boss portion, and a fastening portion. The boss portion has a monotonically changing diameter along its longitudinal axis. The wheel carrier is adapted to be supported by a suspension system of the vehicle and has a wheel-facing side. The wheel carrier is comprised of aluminum and has a spindle-receiving aperture therethrough. The aperture has a variable diameter along its length to form a boss-receiving socket. The boss-receiving socket has a monotonically changing diameter substantially matching the boss portion. A fastener is joined to the fastening portion and draws the boss portion against the boss-receiving socket. Consequently, stresses in the aluminum wheel carrier are distributed over the boss-receiving socket.

DETAILED DESCRIPTION OF PREFERRED EMBODIMENTS

Figure 1:
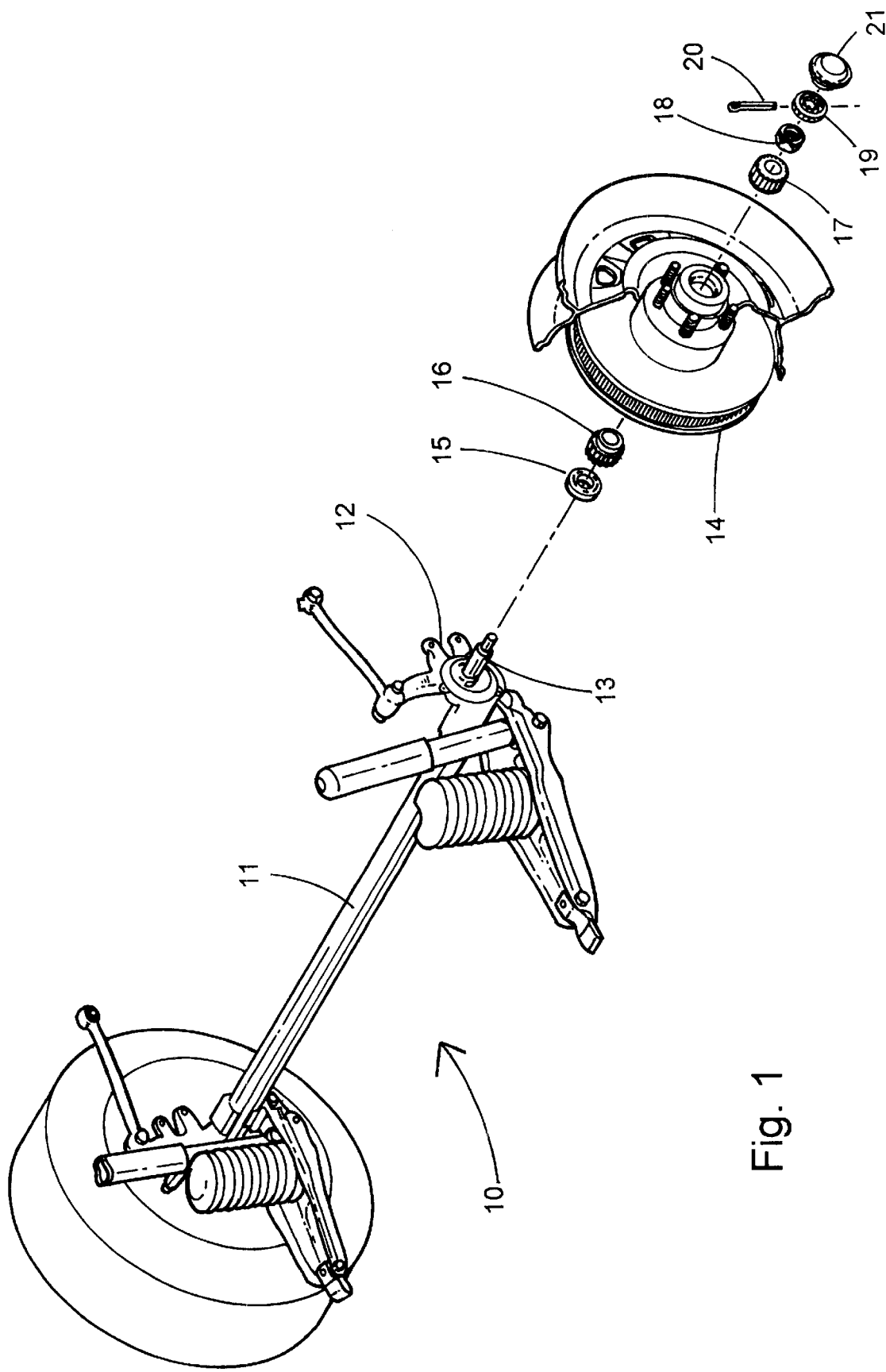
FIG. 1 is an exploded, perspective view of a portion of a prior art suspension system including a wheel carrier and spindle.

Referring to FIG. 1, a prior art suspension system 10 includes a dead axle 11 having a wheel carrier 12 mounted thereto. Wheel carrier 12 supports a spindle 13. A wheel hub 14 is mounted to spindle 13 by means of a grease seal 15, bearings 16 and 17, an adjusting nut 18, a nut retainer 19, a cotter pin 20, and a grease cap 21. The mounting of the spindle must be sufficiently robust to absorb the road loads through the wheels and distribute them to the suspension system.

Figure 2:
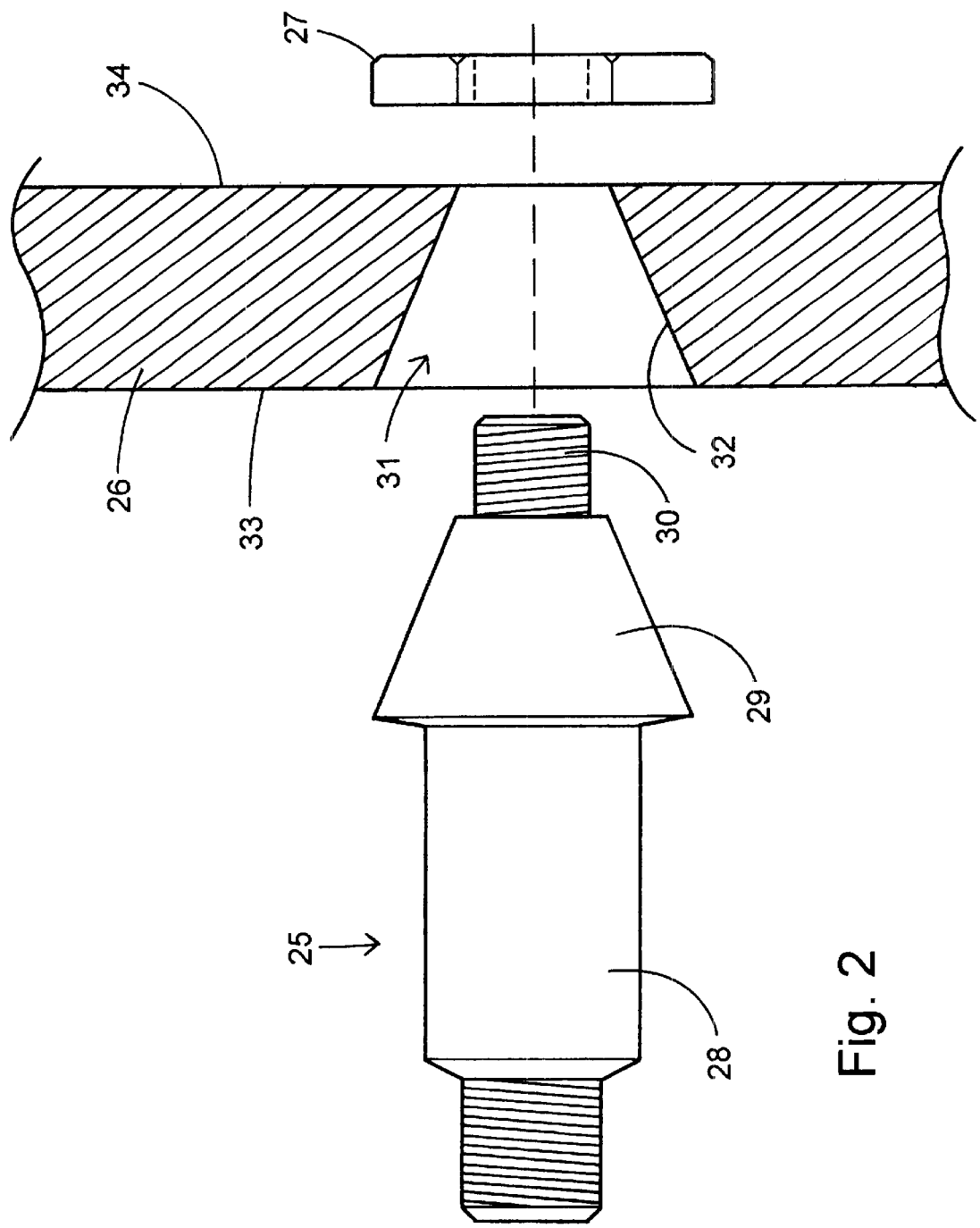
FIG. 2 is a side, partial cross section of a first embodiment of a spindle of the present invention prior to mounting onto a wheel carrier.

Turning now to the present invention, FIG. 2 shows a first embodiment of a spindle 25 which is made of iron or steel for mounting on a wheel carrier 26 comprised of aluminum (e.g., an aluminum alloy). Spindle 25 is comprised of a wheel hub-receiving portion 28, a boss portion 29, and a fastening portion that in this embodiment is formed by a stud 30. Stud 30 is preferably threaded for receiving a fastening nut 27, although other means of fastening such as a bolt could also be used.

Wheel carrier 26 is shown in cross section having a spindle-receiving aperture 31 which defines a boss-receiving socket 32. Boss portion 29, and socket 32 have a matching profile such that they are substantially fully contacting along their interface when boss portion 29 is inserted into socket 32. Specifically, boss portion 29 has a monotonically changing diameter with increasing distance from wheel hub portion 28 to stud 30. In other words, the diameter is either constant or decreasing at a selected rate at every point over the longitudinal axis of boss portion 29. Similarly, socket 32 has a substantially matching diameter which is monotonically changing with increasing distance from a wheel-facing side 33 toward an opposite side 34. The monotonically changing diameters shown in FIG. 2 are comprised of a straight slope.

More specifically, the diameter of boss portion 29 is least at its end closest to the fastening portion to facilitate the drawing of boss portion 29 against socket 32.

Figure 3:
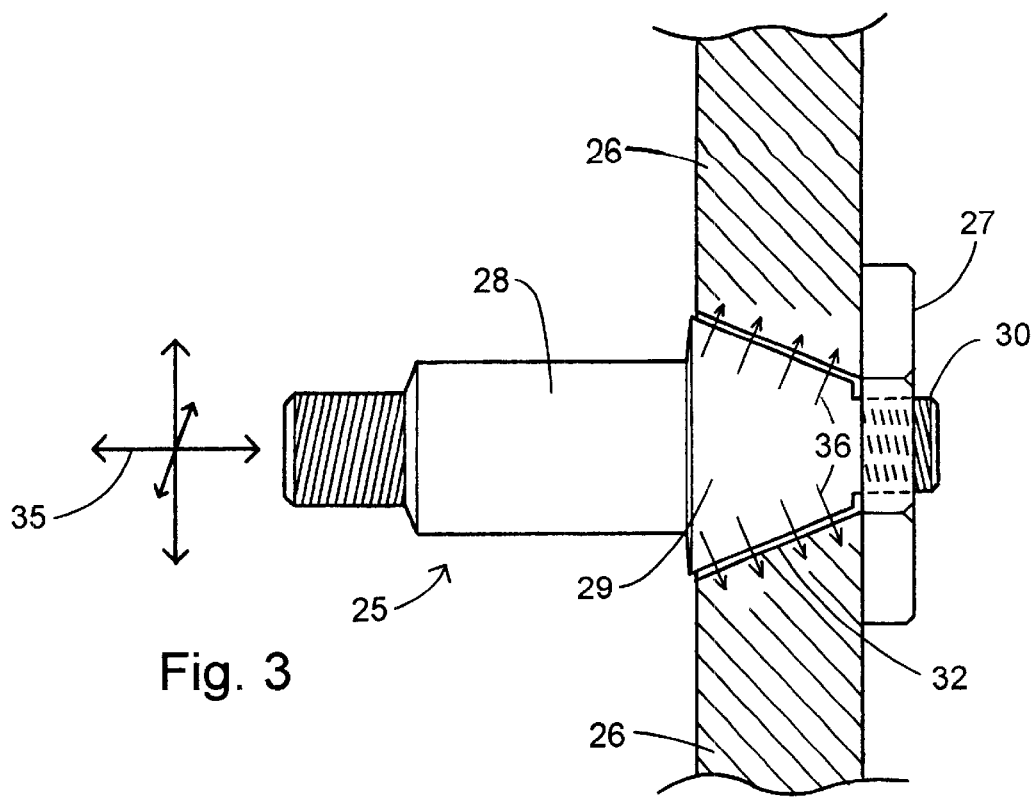
FIG. 3 is a side, partial cross section of the spindle of FIG. 2 after mounting.

FIG. 3 shows spindle 25 after assembly with wheel carrier 26. By tightening nut 27, boss portion 29 is drawn against boss-receiving socket 32. After a wheel hub is mounted to spindle 25 and the vehicle is operated, road loads and forces will be applied against spindle 25 in three dimensions as shown by arrows 35. These forces must propagate through spindle 25 and wheel carrier 26 to the remainder of the suspension system for proper reaction by the suspension system. Using prior art mounting techniques to mount spindle 25 to aluminum wheel carrier 26, these forces would lead to stress problems in the aluminum (e.g., cracking). By increasing the surface contact area of the interface between the aluminum wheel carrier with the iron/steel spindle, the stresses are distributed over a larger area as shown by arrows 36, making the use of aluminum wheel carriers feasible.

Figure 4:
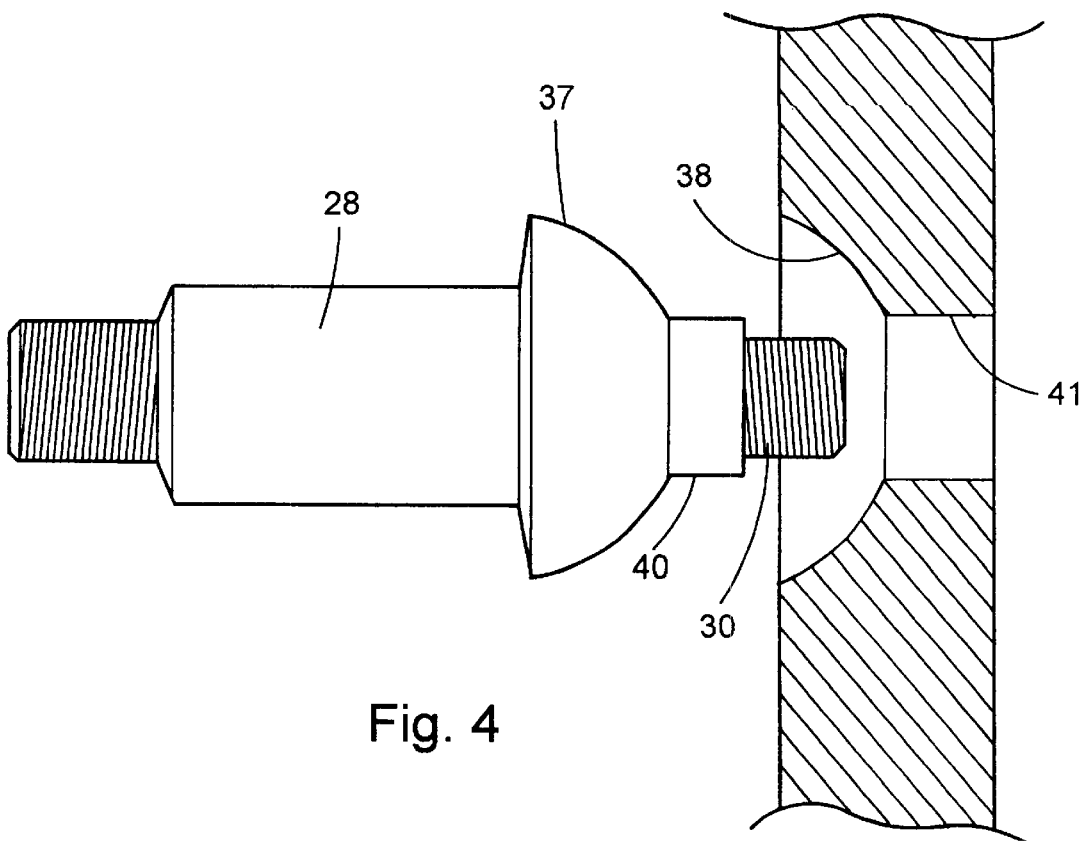
FIG. 4 is a side, partial cross section of an alternative embodiment with a curved socket.
Figure 5:
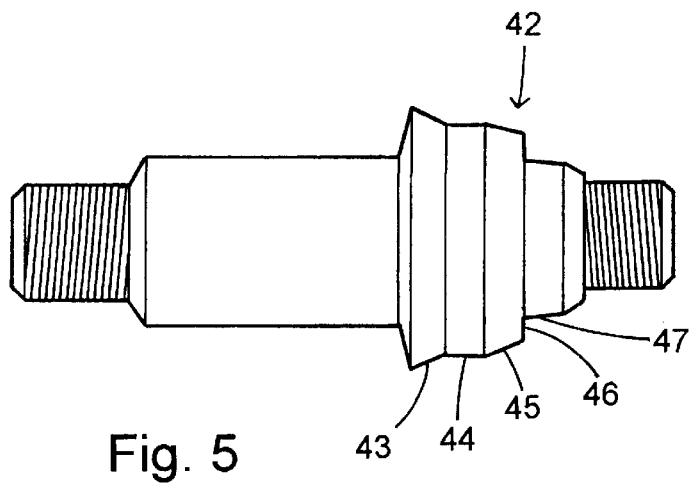
FIG. 5 is a side, partial cross section of an alternative embodiment with a socket having straight segments of different slopes.

In an alternative embodiment shown in FIG. 4, the monotonically changing diameters of a boss portion 37 and a boss-receiving socket 38 are curved. Any monotonic curvature can be used, such as circular, elliptical, or hyperbolic. A curvature comprised of an arc of a circle is shown in FIG. 4. In addition to the curved portion, the boss in this embodiment includes a straight segment 40 having a constant diameter across its longitudinal extent. A matching bore 41 is provided for receiving straight segment 40.

Figure 6:
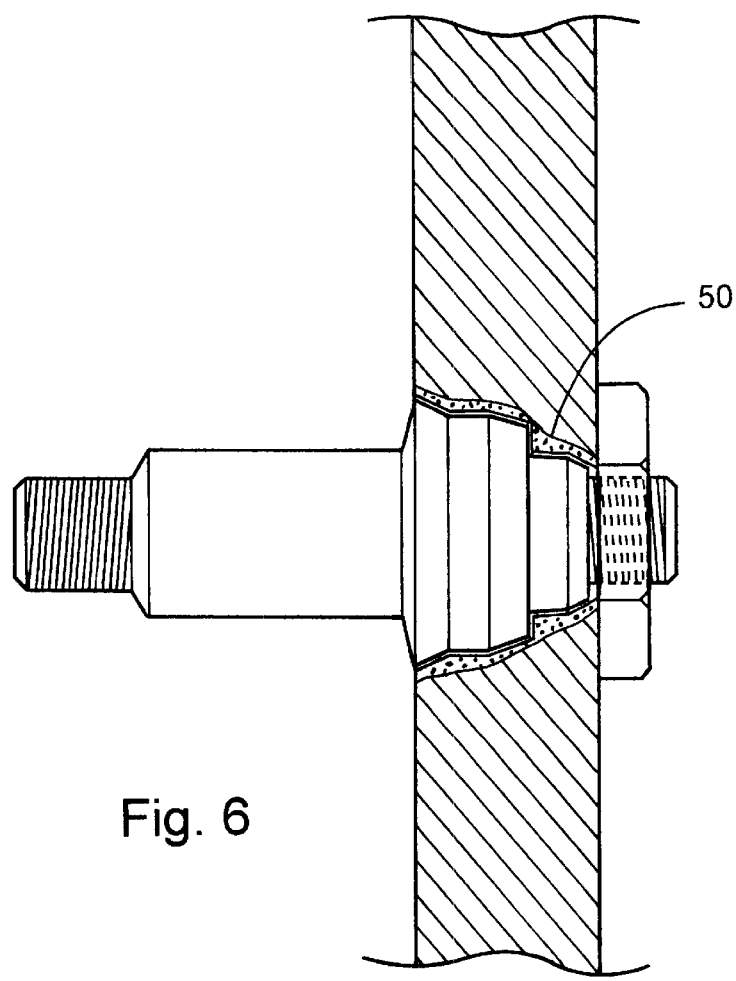
FIG. 6 shows plastic deformation of the wheel carrier.

In another alternative embodiment, a boss portion 42 has a monotonically decreasing diameter with separate straight segments with different slopes. Thus, boss portion 42 includes sloping section 43, constant diameter section 44, sloping section 45, vertical edge 46, and sloping section 47. This embodiment may be less desirable than the above embodiments since the discontinuities of the steps may tend to concentrate stresses. Nevertheless, there is an increased contact area and overall stresses can still be reduced. In order to better ensure full contact between boss portion 42 and the socket, the clamping force created by the fastening of the spindle to the wheel carrier can be large enough to cause plastic deformation in a surface zone 50 of the socket as shown in FIG. 6. By removing any gaps between the boss portion and the socket, less concentration of stresses results. Plastic deformation can be employed in all embodiments of the invention.

Figure 7:
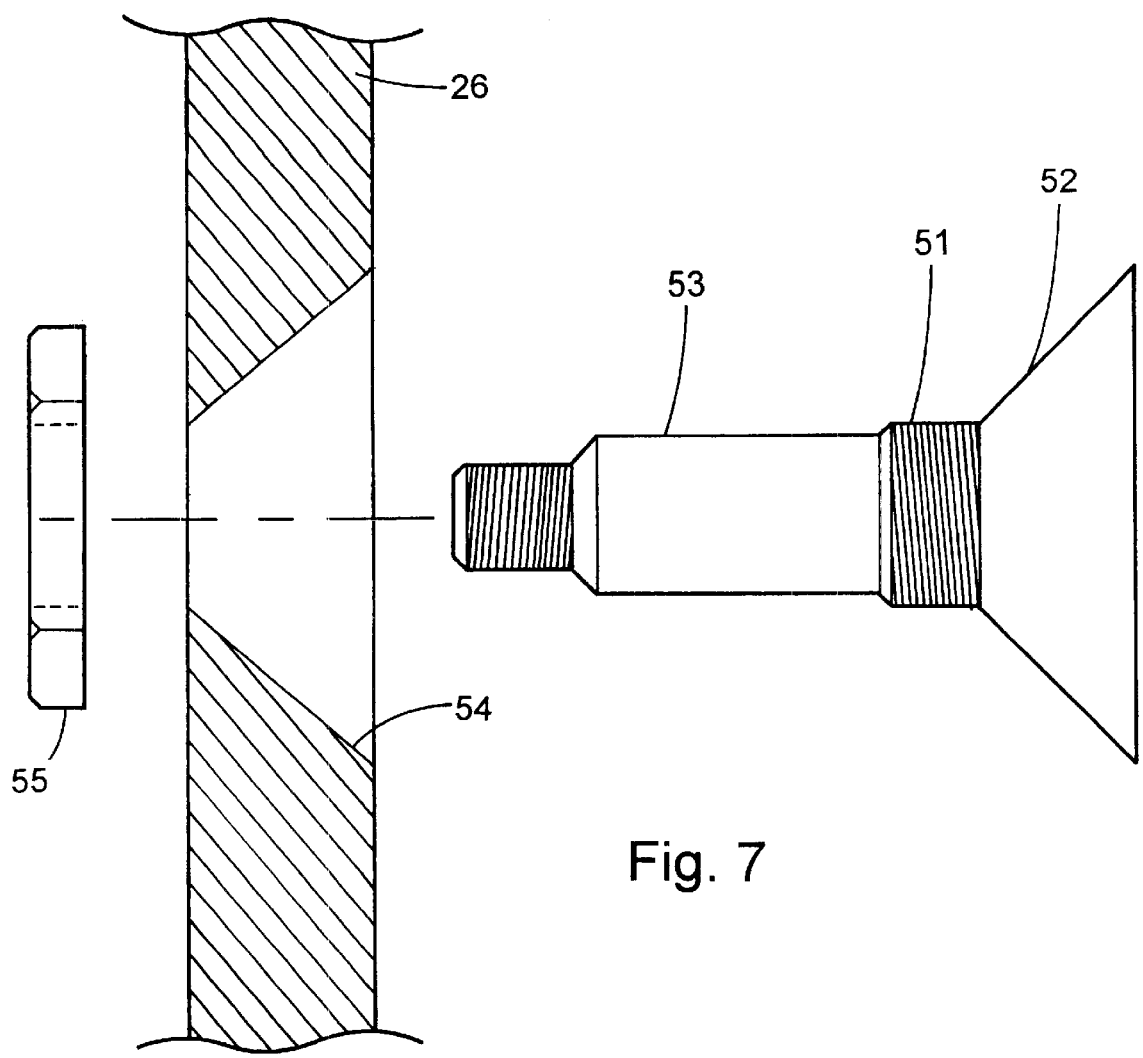
FIG. 7 is a side, partial cross section of an alternative embodiment with the fastening portion located between the boss portion and the hub-receiving portion.

FIG. 7 shows an alternative embodiment with a fastening portion 51 arranged between a boss portion 52 and a hub-receiving portion 53. Boss portion 52 has a changing diameter that is monotonically decreasing moving from its end toward fastening portion 51. Wheel carrier 26 has a matching socket 54 for receiving boss portion 52. A nut 55 engages threads on fastening portion 51 providing positive engagement and an effective distribution of stresses into wheel carrier 26.

What is claimed is:

1. A wheel assembly for a vehicle, comprising:
   a spindle comprising ferrous material and including a hub-receiving portion, a boss portion, and a fastening portion, wherein said boss portion has a monotonically changing diameter along its longitudinal axis, said fastening portion comprised of a stud portion;
   a wheel carrier adapted to be supported by a suspension system of said vehicle and having a wheel-facing side, said wheel carrier comprised of aluminum and having a spindle-receiving aperture therethrough, said aperture having a variable diameter along its longitudinal axis to form a boss-receiving socket, said boss-receiving socket having a monotonically changing diameter substantially matching said changing diameter of said boss portion; and
   a fastener joined to said fastening portion and drawing said boss portion against said boss-receiving socket;
   whereby stresses in said aluminum wheel carrier are distributed over said boss-receiving socket;
   wherein said aperture further comprises a stud-receiving bore of substantially constant diameter between said boss-receiving socket and a side of said wheel carrier opposite said wheel-facing side and wherein said boss-portion includes a straight segment matching said stud-receiving bore.

2. The wheel assembly of claim 1 wherein said diameter of said boss portion monotonically decreases moving longitudinally toward said fastening portion.

3. The wheel assembly of claim 1 wherein said monotonically changing diameter is comprised of a straight slope.

4. The wheel assembly of claim 1 wherein said monotonically changing diameter includes straight segments having different slopes.

5. The wheel assembly of claim 1 wherein said fastening portion is threaded and wherein said fastener is comprised of a nut.

6. A wheel assembly for a vehicle, comprising:
   a spindle comprising ferrous material and including a hub-receiving portion, a boss portion, and a fastening portion, wherein said boss portion has a monotonically changing diameter along its longitudinal axis, wherein said monotonically changing diameter is comprised of a curve;
   a wheel carrier adapted to be supported by a suspension system of said vehicle and having a wheel-facing side, said wheel carrier comprised of aluminum and having a spindle-receiving aperture therethrough, said aperture having a variable diameter along its longitudinal axis to form a boss-receiving socket, said boss-receiving socket having a monotonically changing diameter substantially matching said changing diameter of said boss portion; and
   a fastener joined to said fastening portion and drawing said boss portion against said boss-receiving socket;
   whereby stresses in said aluminum wheel carrier are distributed over said boss-receiving socket.

7. The wheel assembly of claim 6 wherein said diameter of said boss portion monotonically decreases moving longitudinally toward said fastening portion.

8. A The wheel assembly of claim 6 wherein said fastening portion is comprised of a stud portion.

9. The wheel assembly of claim 6 wherein said fastening portion is threaded and wherein said fastener is comprised of a nut.

10. The wheel assembly of claim 6 wherein said fastening portion is arranged between said hub-receiving portion and said boss portion.

11. A wheel assembly for a vehicle, comprising:
    a spindle comprising ferrous material and including a hub-receiving portion, a boss portion, and a fastening portion, wherein said boss portion has a monotonically changing diameter along its longitudinal axis, wherein said monotonically changing diameter is comprised of an arc of a circle;
    a wheel carrier adapted to be supported by a suspension system of said vehicle and having a wheel-facing side, said wheel carrier comprised of aluminum and having a spindle-receiving aperture therethrough, said aperture having a variable diameter along its longitudinal axis to form a boss-receiving socket, said boss-receiving socket having a monotonically changing diameter substantially matching said changing diameter of said boss portion, and
    a fastener joined to said fastening portion and drawing said boss portion against said boss-receiving socket;
    whereby stresses in said aluminum wheel carrier are distributed over said boss-receiving socket.

12. The wheel assembly of claim 11 wherein said diameter of said boss portion monotonically decreases moving longitudinally toward said fastening portion.

13. The wheel assembly of claim 11 wherein said fastening portion is comprised of a stud portion.

14. The wheel assembly of claim 11 wherein said fastening portion is threaded and wherein said fastener is comprised of a nut.

15. The wheel assembly of claim 11 wherein said fastening portion is arranged between said hub-receiving portion and said boss portion.

16. A wheel assembly for a vehicle, comprising:

a spindle comprising ferrous material and including a hub-receiving portion, a boss portion, and a fastening portion, wherein said boss portion has a monotonically changing diameter along its longitudinal axis;

a wheel carrier adapted to be supported by a suspension system of said vehicle and having a wheel-facing side, said wheel carrier comprised of aluminum and having a spindle-receiving aperture therethrough, said aperture having a variable diameter along its longitudinal axis to form a boss-receiving socket, said boss-receiving socket having a monotonically changing diameter substantially matching said changing diameter of said boss portion; and a fastener Joined to said fastening portion and drawing said boss portion against said boss-receiving socket;

whereby stresses in said aluminum wheel carrier are distributed over said boss-receiving socket;

wherein said boss-receiving socket has a surface of plastically deformed aluminum as a result of said boss portion being drawn against said boss-receiving socket by said fastener.

17. The wheel assembly of claim 16 wherein said diameter of said boss portion monotonically decreases moving longitudinally toward said fastening portion.

18. The wheel assembly of claim 16 wherein said fastening portion is comprised of a stud portion.

19. The wheel assembly of claim 16 wherein said fastening portion is threaded and wherein said fastener is comprised of a nut.

20. The wheel assembly of claim 16 wherein said fastening portion is arranged between said hub-receiving portion and said boss portion.

21. The wheel assembly of claim 16 wherein said monotonically changing diameter is comprised of a straight slope.

22. The wheel assembly of claim 16 wherein said monotonically changing diameter is comprised of a curve.

23. The wheel assembly of claim 16 wherein said monotonically changing diameter includes straight segments having different slopes.

24. A wheel assembly for a vehicle, comprising:

a spindle comprising ferrous material and including a hub-receiving portion, a boss portion, and a fastening portion, wherein said boss portion has a monotonically changing diameter along its longitudinal axis, said fastening portion comprised of a stud portion;

a wheel carrier adapted to be supported by a suspension system of said vehicle and having a wheel-facing side, said wheel carrier comprised of aluminum and having a spindle-receiving aperture therethrough, said aperture having a variable diameter along its longitudinal axis to form a boss-receiving socket, said boss-receiving socket having a monotonically changing diameter substantially matching said changing diameter of said boss portion; and a fastener joined to said fastening portion and drawing said boss portion against said boss-receiving socket;

whereby stresses in said aluminum wheel carrier are distributed over said boss-receiving socket;

wherein said fastening portion is arranged between said hub-receiving portion and said boss portion.

25. The wheel assembly of claim 24 wherein said diameter of said boss portion monotonically decreases moving longitudinally toward said fastening portion.

26. The wheel assembly of claim 24 wherein said fastening portion is comprised of a stud portion.

27. The wheel assembly of claim 24 wherein said fastening portion is threaded and wherein said fastener is comprised of a nut.

28. The wheel assembly of claim 24 wherein said monotonically changing diameter is comprised of a straight slope.

29. The wheel assembly of claim 24 wherein said monotonically changing diameter is comprised of a curve.

30. The wheel assembly of claim 24 wherein said monotonically changing diameter is comprised of an arc of a circle.

31. The wheel assembly of claim 24 wherein said monotonically changing diameter includes straight segments having different slopes.

* * * * *